United States Patent
Poon et al.

(10) Patent No.: US 7,269,171 B2
(45) Date of Patent: Sep. 11, 2007

(54) MULTI-DATA RECEIVE PROCESSING ACCORDING TO A DATA COMMUNICATION PROTOCOL

(75) Inventors: Kacheong Poon, Milpitas, CA (US); Cahya Adi Masputra, Millbrae, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1078 days.

(21) Appl. No.: 10/254,699

(22) Filed: Sep. 24, 2002

(65) Prior Publication Data

US 2004/0057434 A1  Mar. 25, 2004

(51) Int. Cl.
*H04L 12/28* (2006.01)
*H04L 12/56* (2006.01)

(52) U.S. Cl. .................. 370/392; 370/389; 370/401
(58) Field of Classification Search ............. None
See application file for complete search history.

(56) References Cited

U.S. PATENT DOCUMENTS

| | | | |
|---|---|---|---|
| 5,991,299 A * | 11/1999 | Radogna et al. | 370/392 |
| 6,947,430 B2 * | 9/2005 | Bilic et al. | 370/395.71 |
| 6,956,853 B1 * | 10/2005 | Connery et al. | 370/392 |
| 6,963,586 B2 * | 11/2005 | Henriksson et al. | 370/469 |

* cited by examiner

*Primary Examiner*—Chi Pham
*Assistant Examiner*—Ronald Abelson
(74) *Attorney, Agent, or Firm*—Martine Penilla & Gencarella, LLP

(57) ABSTRACT

Embodiments of the present invention provide for multi-data receiving and processing by a network communication protocol. The present invention aggregates multiple data packets destined for the same application. The present invention also provides for header/payload splitting. The present invention also provides for the separate processing of aggregated headers and aggregated payloads. As a result, per-packet processing costs are reduced and data locality is increased.

33 Claims, 9 Drawing Sheets

MULTI-DATA RECEIVE PROCESSING ACCORDING TO A DATA COMMUNICATION PROTOCOL

FIELD OF THE INVENTION

Embodiments of the present invention relate to communication across a network, and more particularly to computer network communication protocols for receiving data packets.

BACKGROUND OF THE INVENTION

In the conventional art, network devices (computers, workstations, servers, or the like) generally comprise hardware, an operating system, and one or more user programs (hereinafter referred to as applications). The hardware (e.g., processor, memory, input/output devices, etc.) provides the basic computing resources. The applications (e.g., database systems, text editors, games, and the like) provide users with various functions. The operating system controls and coordinates the use of the hardware among the various applications.

The Unix operating system (Unix) is one example of an operating system that is currently used by many enterprise computer systems. Unix consists of two separable parts, which include the kernel space and user space. The user space typically provides an operating environment for executing system libraries, compilers, interpreters, shells and other such modules, which provide useful functions to the user. The kernel space provides an operating environment for executing central control processes such as filesystem access, communication protocols, and other system facilities.

The kernel space typically includes one or more network communication protocols, such as the TCP/IP protocol suite. The TCP/IP protocol suite is typically divided into three software layers: transport layer, internet layer, and network access layer. The transport layer (TCP) provides a flow control protocol. The flow control protocol keeps track of data packets to assure reliable delivery to an appropriate application. It includes explicit and acknowledged connection initiation and termination, reliable in-order unduplicated delivery of data, and out of band indication of urgent data. The internet layer (IP) provides an addressing and routing protocol. The addressing and routing protocol provides host-to-host addressing and routing of data packets, data packet fragmentation and reassembly. The network access layer provides a driver protocol. The driver protocol provides access to and transmission of data across a communication channel (physical layer).

Referring to FIG. 1, a diagram of a network communication receive stream in accordance with the convention art is shown. As depicted in FIG. 1, one or more data packets 110 are individually communicated across a communication channel. Each data packet is comprised of a header 115 and a payload 120. A driver module 125 receives the data packets and stores them in a buffer. The driver module 125 sends an interrupt to the processor indicating that a data packet has been received. The interrupt causes the protocol module 130 to process the header, providing for addressing and flow control. In so doing the protocol module 130 fetches the header portion of the data packet 135. The interrupt then causes the application 140 to process the payload. In so doing, the application 140 also fetches the payload portion of the data packet 145.

In the conventional art, the above process is repeated in sequence for each data packet received. The packets thereby being individually loaded. Thus, such a protocol is inefficient for data locality, because each data packet resides in different memory locations. Such a protocol also incurs high input/output memory management units costs. For example, if three data packets are received, six fetch cycles are required. The protocol performs an input/output memory management unit for fetching the header of each data packet. The application also performs an input/output memory management unit for fetching the payload of each data packet. The protocol also introduces unnecessary additional interaction between the transport layer and the application. Hence, the overall processing costs are very high according to the conventional art.

Furthermore, the transfer layer has a finite buffer for holding data packets. In the current art, if the data packets are received faster than the protocol module can process them, the driver module may drop data packets.

SUMMARY OF THE INVENTION

Accordingly, there is a continued need for a network communication method capable of reducing per-packet processing costs. The network communication method should also provide for reduced input/output memory management unit cycle costs. The network communication method should also provide for reduced processor utilization. The network communication method should also provide for increase network throughput.

Embodiment of the present invention provide for multi-data (e.g., multi-packet) receiving and processing by a network communication protocol. Embodiments of the present invention also provide for aggregating multiple data packets destined for the same application. Embodiments of the present invention also provide for header/payload splitting. Embodiments of the present invention also provide for the separate processing of aggregated headers and aggregated payloads. Thus, embodiments of the present invention advantageously reduce per-packet receive costs and overhead by receiving multiple data simultaneously through the software layers, while increasing data locality.

Embodiments of the present invention also provide for contiguous memory blocks containing header regions and payload regions, of the aggregated multiple data packets destined for the same application. Embodiments of the present invention also provide for a contiguous memory block containing metadata concerning the contents and location of the header regions and payload regions. Embodiments of the present invention also provide for passing pointers to the header regions, payload regions, and or metadata regions through the software layers. Thus, embodiments of the present invention advantageously increase data locality, while reducing per-packet processing costs and overhead by processing multiple data packets simultaneously through the software layers.

Accordingly, embodiments of the present invention avoid fundamental changes to the streams framework for processing data packets, and minimize potential impact on network device stability and performance. Embodiments of the present invention also provide a flexible and protocol-independent method for receiving data packets.

Embodiments of the present invention only require minimal and localized changes throughout the kernel. Embodiments of the present invention maintain compliance with current networking standards. Embodiments of the present invention are backward compatible with non-multi-data reception device drivers and other protocols or technologies (e.g. IPsec, IPQoS, CGTP, and the like). Furthermore, current applications benefit from the increase in network throughput and reduced processor utilization provided by embodiments of the present invention.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Figure 1:
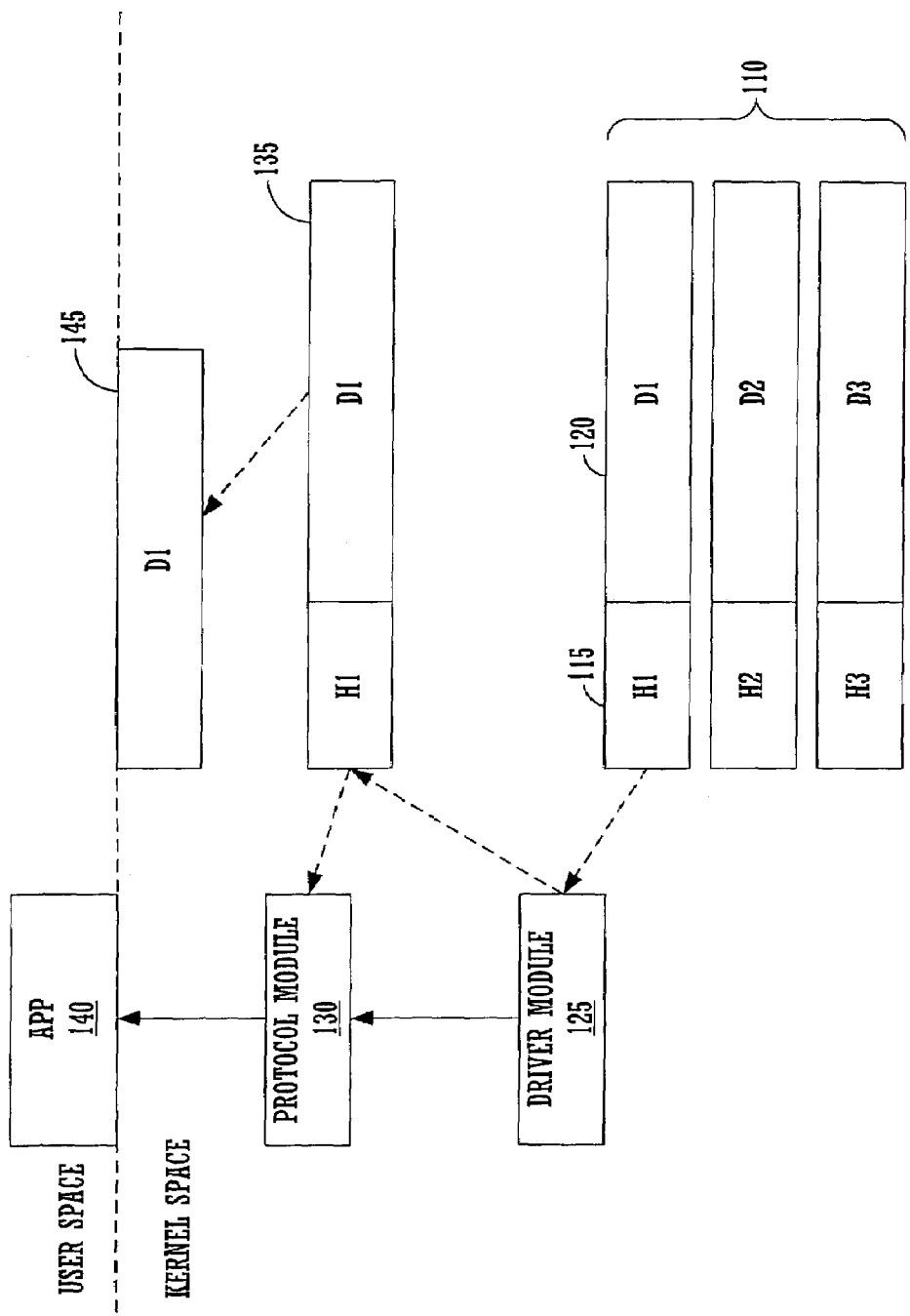
FIG. 1 shows a diagram of a network communication receive stream in accordance with the conventional art.
Figure 2:
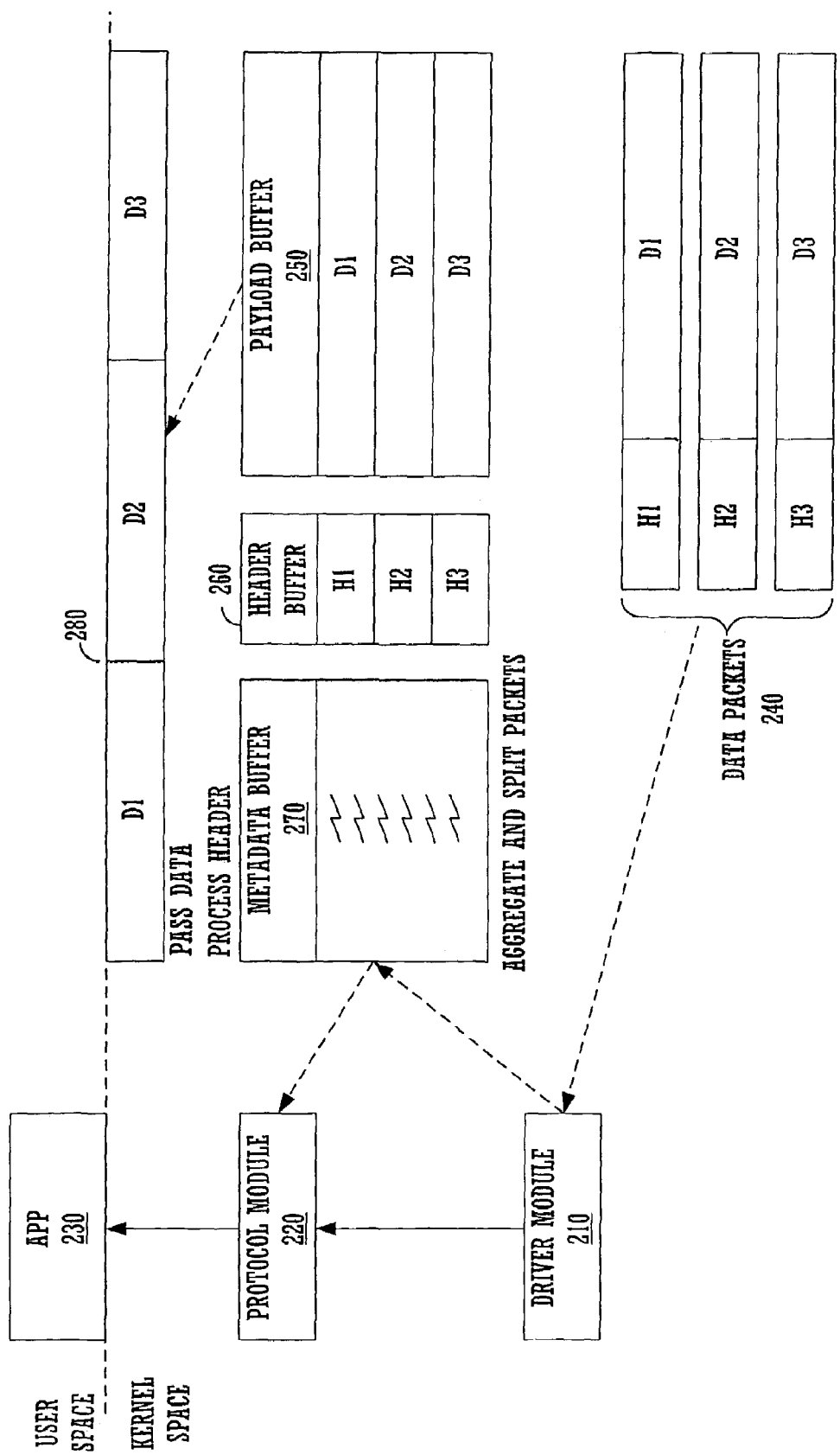
FIG. 2 shows a diagram of a network communication receive stream in accordance with one embodiment of the present invention.

Referring now to FIG. 2, a diagram of a network communication receive stream (made up of software abstraction layers) in accordance with one embodiment of the present invention is shown. As depicted in FIG. 2, the receive stream comprises a driver module 210 communicatively coupled to a protocol module 220. The protocol module 220 is communicatively coupled to an application 230, by way of a logical port assignment in one implementation. The protocol module and application are implemented in software. The driver module may be implemented in hardware or software.

The driver module 210 provides for receipt of data packets transmitted across a network. The driver module 210 also implements multi-data receipt, which permits multiple data packets destined for the same application to be aggregated in accordance with embodiments of the present invention. The driver module 210 waits for a predefined condition when collecting multiple data packets 240 for the same application. The predefined condition is select selected so as to optimize performance of the network communications receive stream.

In one configuration, the predetermined condition may be a specified maximum number of packets. In an exemplary configuration, the maximum number of packets is selected from a range of 2-10 data packets, but could be any number. In another configuration, the predefined condition may be an interval of time chosen such that the sending network device does not resend the data packets because an acknowledgment has not been received. In another configuration, the predefined condition may be an interval of time chosen such that latency is not unduly increased. Furthermore, if a data packet is received for another destination, the aggregation of the previous data packets may be terminated.

When multiple data packets 240 for the same application are received, the driver module 210 also implements header/payload splitting in accordance with embodiments of the present invention. Splitting data packets causes the payload of each packet to be loaded into a payload buffer 250, the header of each packet to be loaded into a header buffer 260, and information about the aggregation and splitting to be loaded into a metadata buffer 270. These buffers may be specific to a particular application 230. The metadata buffer 270 may contain information such as a pointer to the start of the header buffer and payload buffer, the number of packet elements, the location and length of each packet element, and the like.

In one implementation, the driver module 210 loads the headers and payloads into the respective buffers 250, 260 in the order that the data packets are received. In another implementation, the driver module 210 reorders the data packets according to the sequence number in the header of each packet, before loading the header and payloads into respective buffers 250, 260. It is appreciated that buffers 270, 260, and 250 contain information regarding multiple data packets.

In an additional implementation, a data source module is the source of network data on reception, rather than the device driver. In such a case, loopback can be provided wherein one application communicates to another application residing in the same machine, as opposed to a remote location. In this scenario, the data source is no longer the device driver, but rather a separate instance of the networking stack that exists on behalf of the sending application. Hence the sending transport layer is able to generate multiple packets in similar fashion as the receiving device driver/hardware. The data source module provides all of the above-described functionality of the device driver. As a result, the present invention may be extended for loopback operation.

The driver module 210 then passes a metadata pointer to the protocol module 220. The metadata pointer in one example may be the starting location of the metadata buffer 270 in memory. Protocol module 220 is made up of a network module and transport module. In one example, the network module provides an IP protocol and the transport module provides a TCP protocol.

Upon receipt of the metadata pointer, the protocol module 220 fetches the information in the metadata buffer 270. The information contained in the metadata buffer 270 provides the protocol module 220 with a pointer to the header buffer 260. Therefore, the protocol module 220 can advantageously retrieve the headers for the multiple data packets 240 in a single input/output memory management unit. The protocol module 220 then processes each header by any well-known protocol used by the particular network.

In one implementation, the protocol module 220 then passes a payload pointer to the destination application 230. When the driver module 210 reorders the data packets according to the sequence number in the header of each packet, the payload buffer 250 logically represents a contiguous payload. In another implementation, the protocol module 220 copies the payloads from the payload buffer 250 into an application buffer 280, according to the sequence number in the corresponding header. The application buffer 280 therefore contains a contiguous payload.

Thus, the receive stream only performs one input/output memory management unit operation on each of the contiguous memory blocks representing the header buffer 260 and the payload buffer 250, for all of the aggregated data packets 240, during each receive call to the protocol module 220. Therefore, the multiple data packets are processed simultaneously with reduced overhead processing per packet. Furthermore, the stream only performs one memory lock on each of the contiguous memory blocks representing the header buffer 260 and the payload buffer 250.

Hence, buffering the data packet headers in a single contiguous header buffer 260, rather than multiple individual header buffers each time a data block is received, reduces the per-packet processing that the protocol module has to perform and reduces the overall overhead cost of processing the data.

Figure 3:
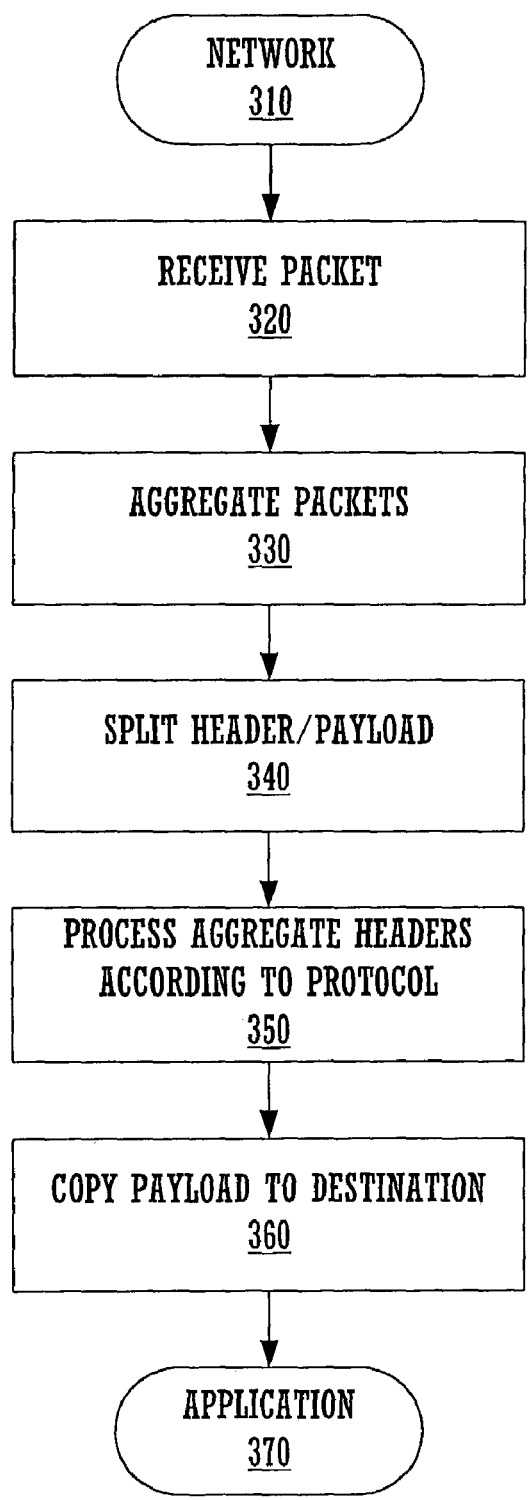
FIG. 3 shows a flow diagram of a data packet receive process in accordance with one embodiment of the present invention.

Referring now to FIG. 3, a flow diagram of a receive process in accordance with one embodiment of the present invention is shown. As depicted in FIG. 3, the process begins at step 310 with the transmission of data packets from a network. the process continues with receipt of one or more data packets from the network, at step 320. The header and payload of each data packet is split, at step 340. The aggregate header are then processed in accordance with an applicaple protocol (e.g. network IP, transport TCP), at step 350. The pay load is copied to the destination application at step 360 and the is completed at step 370 when the payload is received by the application. step 360 and the process is comleted at step 370 when the payload is by the application.

Placing the header information and payload information into two contiguous chunks of memory reduces the per-packet processing cost associated with the protocol. For example, if three data packets are received, two fetch cycles are required. The protocol performs a header fetch cycle for the aggregated headers. The application also performs a payload fetch cycle for the aggregated payload. In the method according to the conventional art, six fetch cycles would be performed when three data packets are received.

Figure 4:
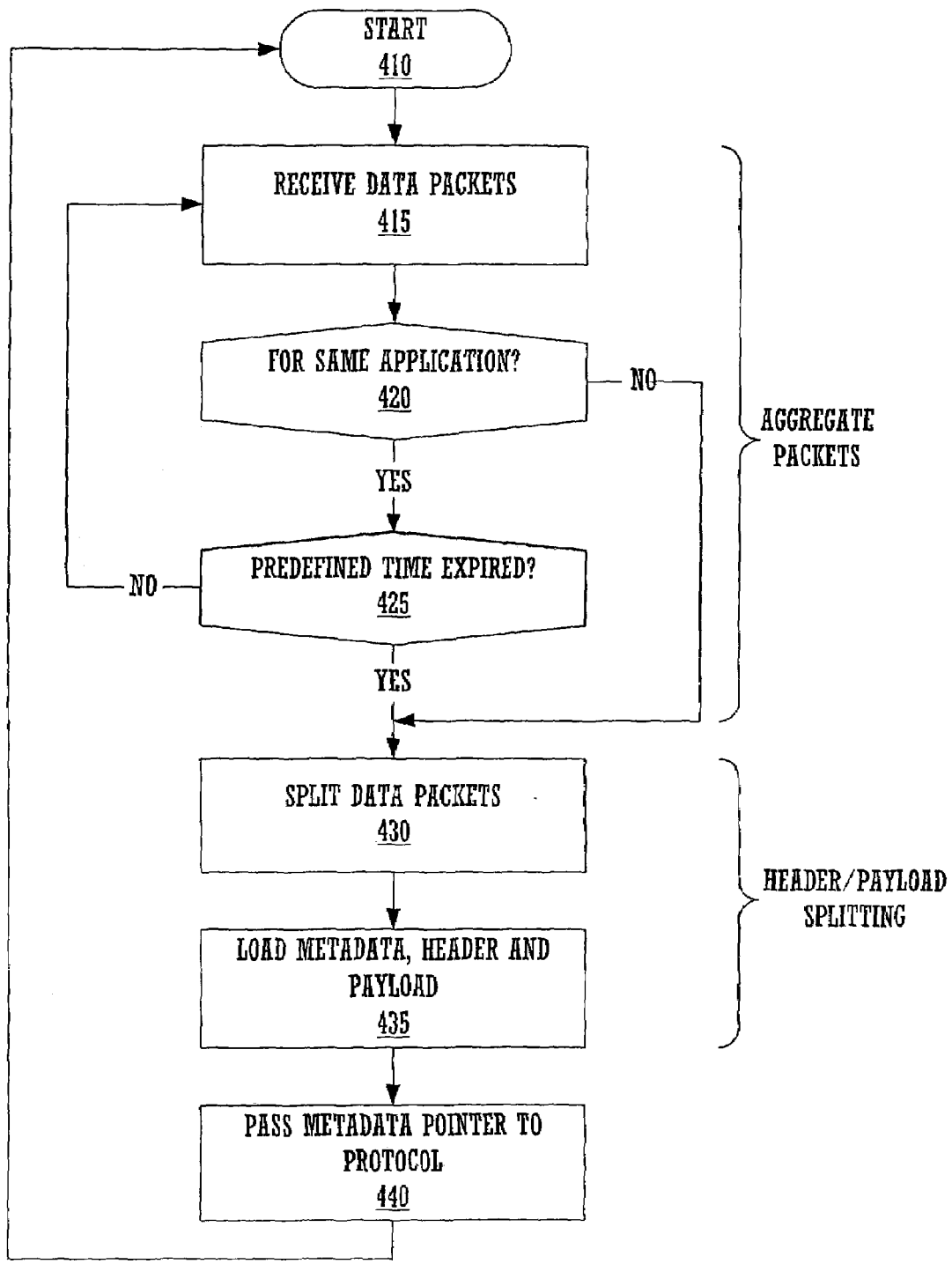
FIG. 4 shows a flow diagram of a data packet aggregation and splitting process.

Referring now to FIG. 4, a flow diagram of a data packet aggregation and splitting process is shown. As depicted in FIG. 4, the process begins with receipt of one or more data packets, at step 415. The process collects data packets destined for the same application until a packet for a different application is received, at step 420, or until a predefined time limit expires, at step 425. The data packets, destined for the same application, are split, at step 430. The header for each such data packet is loaded into a contiguous header buffer space. The payload for each such data packet is loaded into a contiguous payload buffer space. Metadata about the aggregated and split data packets are also loaded into a corresponding contiguous metadata buffer space, at step 435. The process then passes a metadata pointer to the protocol layer, at step 440.

In an optional feature of the present embodiment, the header and payload are re-ordered according to their sequence when loaded into their corresponding header and payload buffer space, at step 435.

Figure 5:
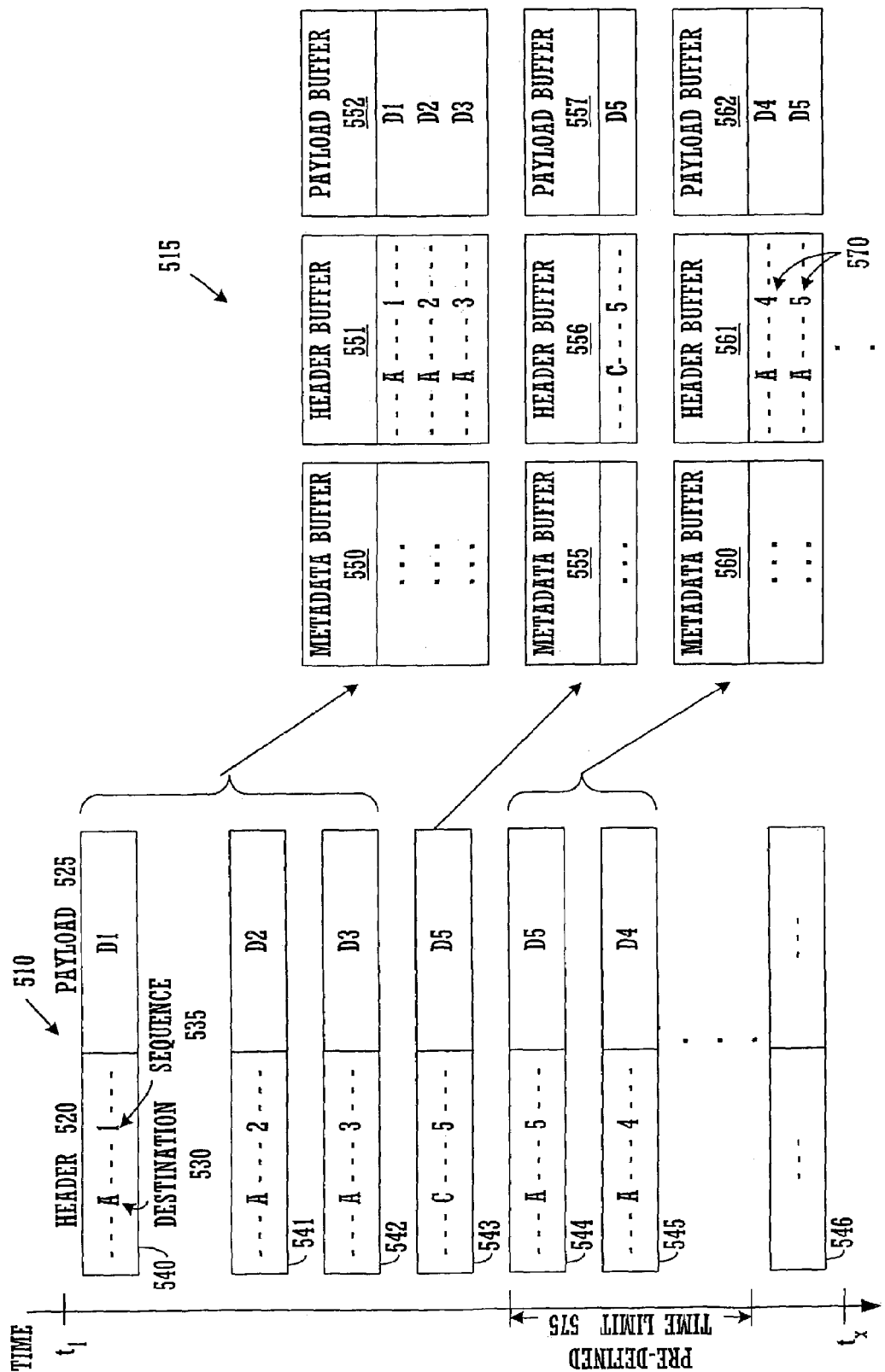
FIG. 5 shows data packets to be received, and buffers containing the received aggregated and split data packets.

Referring now to FIG. 5, a memory diagram illustration of data packets to be received 510 and buffers containing the received aggregated and split data packets 515 are shown. As depicted in FIG. 5, each data packet comprises a header portion 520 and a payload portion 525. The header portion 520 contains various protocol data, including a destination identifier 530 and a sequence identifier 535.

As illustrated, the first data packet 540 to be received is destined for application A and has a sequence number of 1. The next two data packets 541, 542 are also destined for application A. The forth data packet 543 is destined for application C. While the fifth and sixth data packets 544, 546 are also destined for application A.

The first three data packets 540, 541, 542 are aggregated and split to create a corresponding metadata buffer 550, header buffer 551, and payload buffer 552. The forth data packet 543, destined for application C, restarts a new aggregation and splitting sequence. Thus a corresponding metadata buffer 555, header buffer 556, and payload buffer 557 are created for the forth data packet 543. The fifth and sixth data packets 544, 545 are destined for A, and therefore another new aggregation and splitting sequence occurs. A corresponding metadata buffer 560, header buffer 561, and payload buffer 562, are created containing the fifth and sixth data packets 544, 545. Another data packet is not received prior to expiration of a pre-defined time limit 565, and therefore the aggregation and splitting sequence terminates. Subsequence receipt of additional data packets 546 will then cause a new aggregation and splitting sequence to occur.

In one implementation, the data packet headers and payloads are loaded into the corresponding buffers in the order that they are received. In another implementation, as illustrated in FIG. 5, the data packet headers and payloads are loaded into the corresponding buffers according to their sequence numbers 570.

Figure 6:
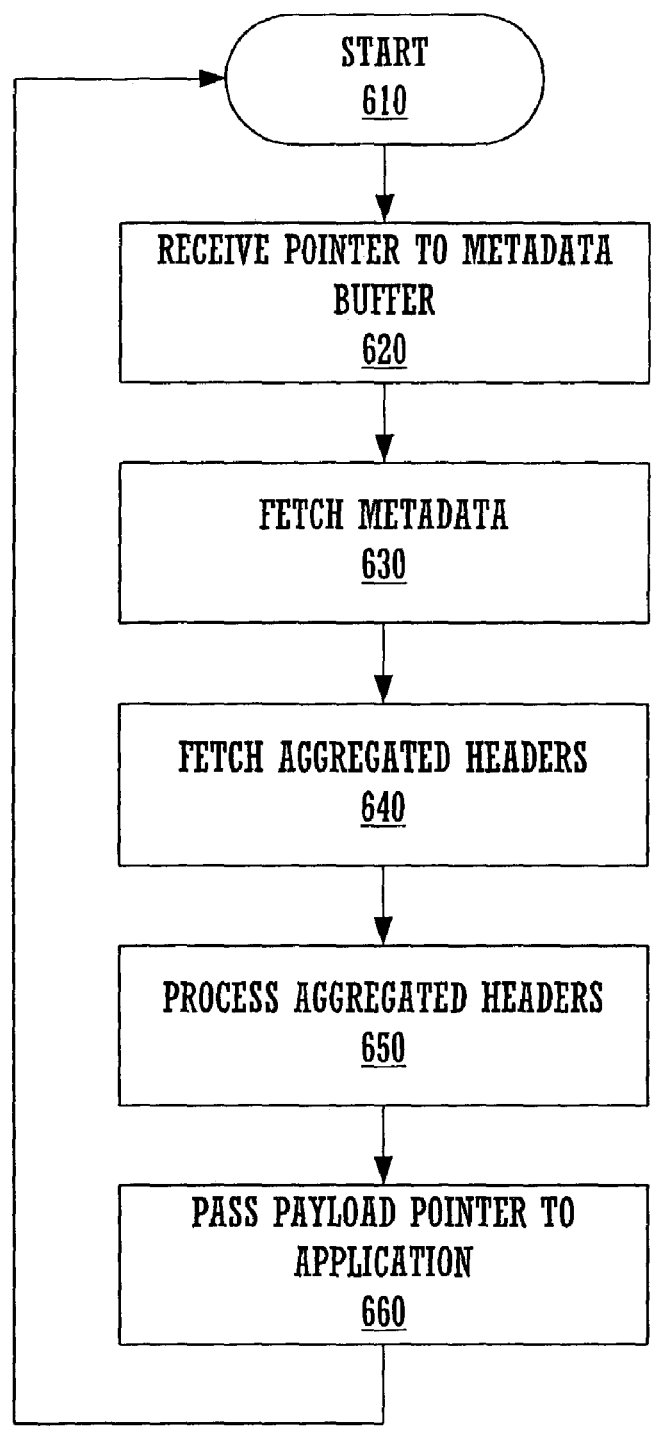
FIG. 6 shows a flow diagram of a protocol process utilizing the aggregated and split data packet reception method in accordance with one embodiment of the present invention.

Referring now to FIG. 6, a flow diagram of a protocol process utilizing the aggregated and split data packet reception method in accordance with one embodiment of the present invention is shown. As depicted in FIG. 6, the process begins with setp 610 and proceeds with receipt of a pointer to a metadata buffer, at step 620. The content of the metadata buffer is then fetched in one input/output memory management unit, at step 630. The content of the metadata buffer provides the protocol with information such as: pointers to the start of the header buffer and payload buffer, the number of packet elements, the location and length of each packet element, and the like. With this information, the content of the header buffer is fetched in one input/output memory management unit, at step 640. The protocol then processes the aggregated headers, at step 650. If the data packets are received correctly, as verified by the protocol, a pointer to the payload buffer is passed to the destination application, at step 660.

In an alternative feature of the present embodiment, the payload buffer contents are copied to an application buffer. The payload is ordered according to the data packet sequence when being copied into the application buffer.

Buffering the data packet headers in a single contiguous header buffer reduces the per-packet processing that the protocol module has to perform and reduces the overall overhead cost of processing the data. For example, if three data packets are received, two fetch cycles are required. The protocol performs a fetch cycle for the metadata 630. The application also performs a fetch cycle for the aggregated headers 640.

Figure 7:
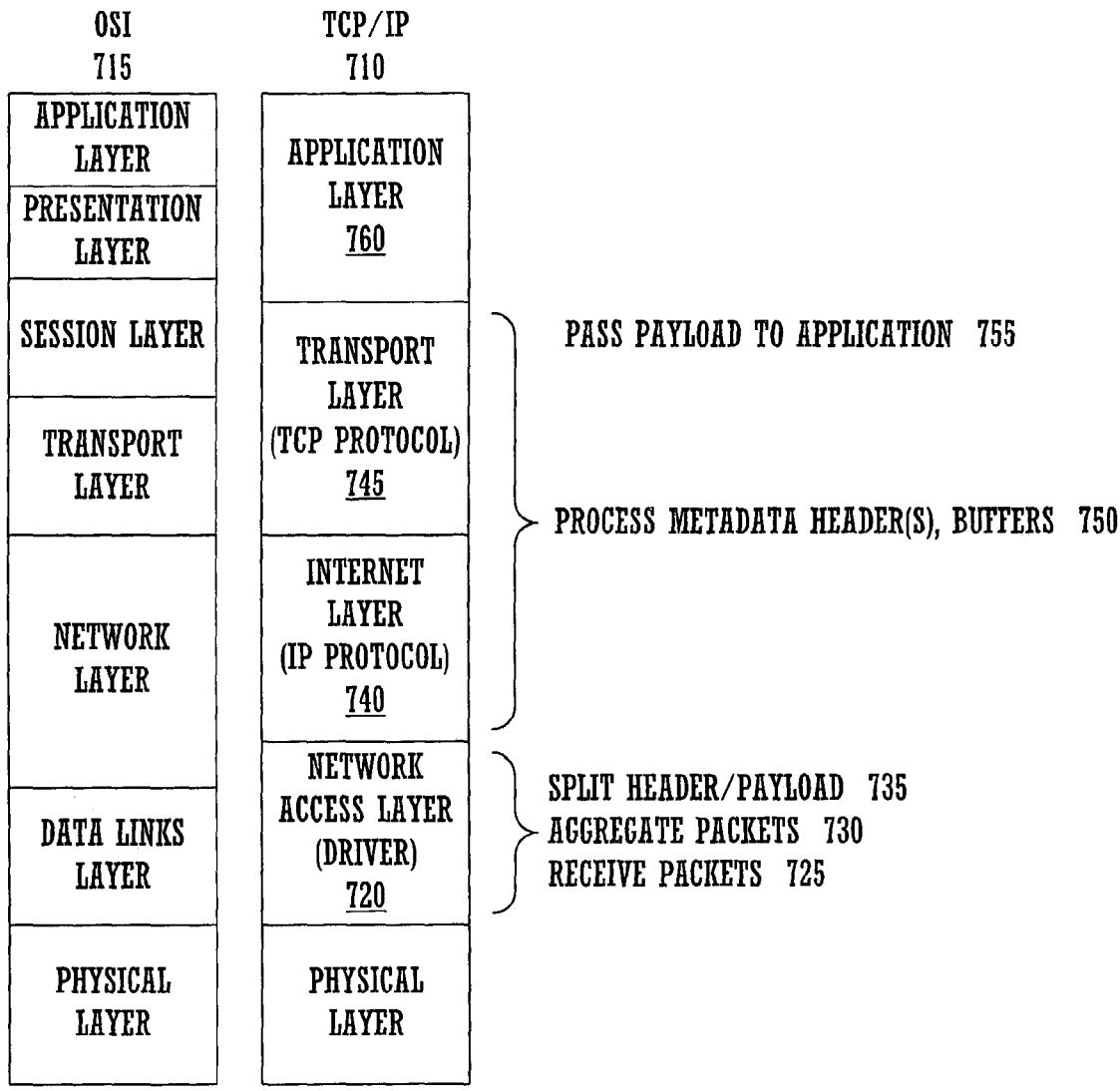
FIG. 7 shows a block diagram of various protocol architectures for implementing embodiments of the present invention.

Referring now to FIG. 7, a block diagram of various protocol architectures for implementing embodiments of the present invention is shown. As depicted in FIG. 7, embodiment of the present invention may be realized using a TCP/IP 710, Open System Interconnect (OSI) 715, or like architecture.

In one implementation of the present invention, a network access layer 720 of the TCP/IP suite 710 provides for receipt of data packets 725, aggregating packets 730 destined for the same location, and packet splitting 735 to form a metadata buffer, header buffer, and payload buffer for the corresponding aggregated data packets 730.

An internet layer 740 and a transport layer 745 of the TCP/IP suite 710 provides for processing the aggregated contents of the header buffer to provide routing and flow control functions 750. Upon completion of the internet layer 740 and transport layer 745, the aggregated contents of the payload buffer 755 are provided to an application layer 760.

Those skilled in the art will appreciate that the present invention can be realized using any number of other protocol architectures. From the teachings contained herein, those skilled in the art will also have sufficient information to apply the present invention within other such protocol architectures. Therefore other such protocol architectures will not be discussed further.

Figure 8:
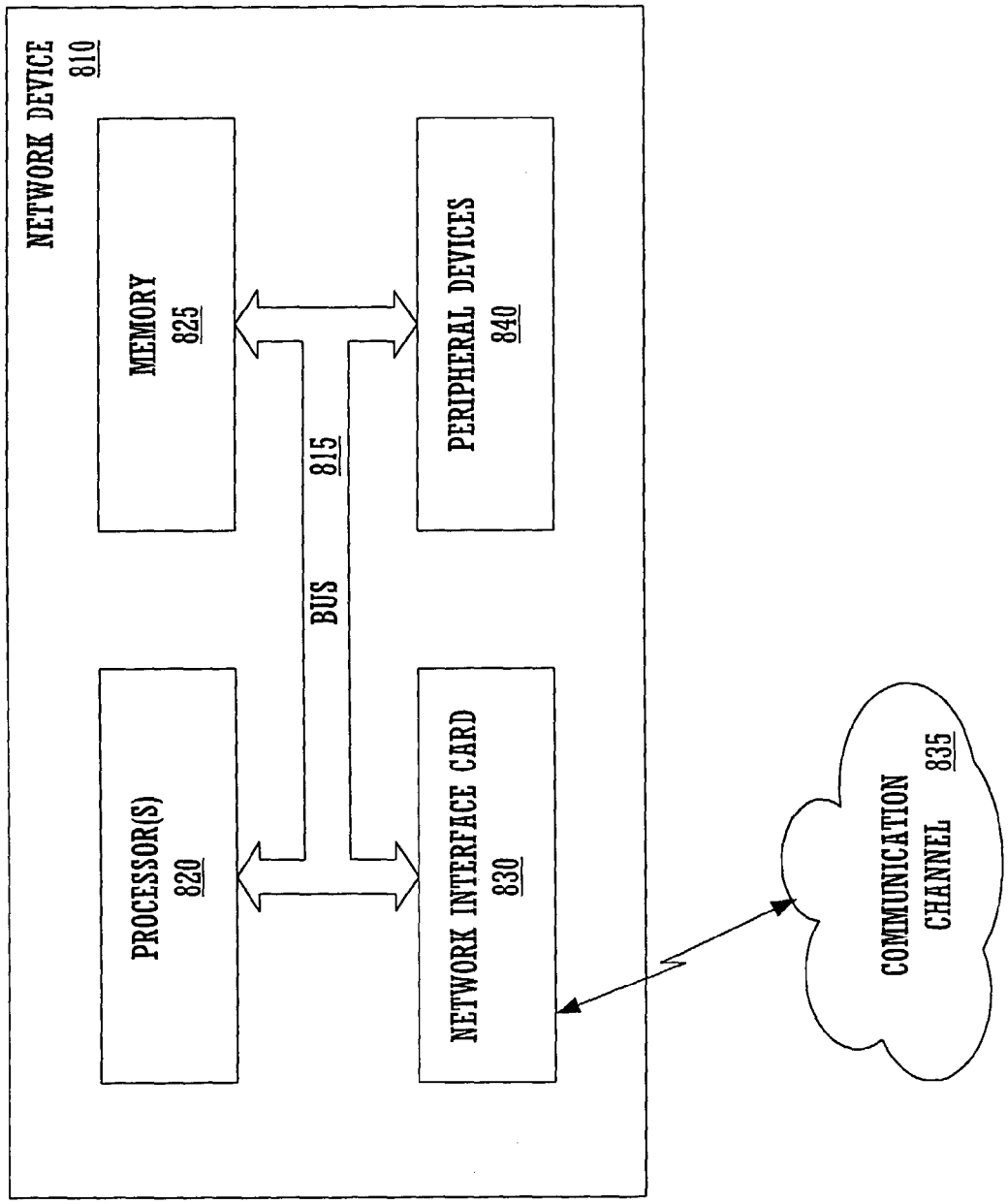
FIG. 8 shows a block diagram of an exemplary network device in accordance with one embodiment of the present invention.

With reference now to FIG. 8, a block diagram of a network device 810 in accordance with one embodiment of the present invention is shown. As depicted in FIG. 8, the network device 810 comprises an address/data bus 815 for communicating information and instructions. One or more processors 820 are coupled with the bus 815 for processing information and instructions. A memory unit 825 is also coupled to the bus 815 for storing information and instructions for the processor(s) 820. The memory unit 825 may include volatile memory (e.g. random access memory, static RAM, dynamic RAM, and the like), non-volatile memory (e.g. read only memory, programmable ROM, flash memory, EPROM, EEPROM, and the like), mass data storage (e.g. hard disk, optical disk, floppy disk, and the like), and the like. The network device 810 also includes a network interface card (NIC) 830 coupled with the bus 815. The NIC 830 provides for communicating with other network devices across a communication channel 835. The NIC 830 conforms to a Data Link Provider Interface (DLPI) or like standard. Optionally, the network device 810 may include peripheral devices 840 (e.g. display, keyboard, pointing device, speaker, and the like).

Certain processes and steps of the present invention are realized as a series of instructions (e.g. code) that reside within the memory unit 825 and are executed by the processor(s) 820. When executed, the instructions cause the network device 810 to provide an operating environment.

Furthermore, one or more applications may be executing on the network device 810 and controlled by the operating environment. For each application, there may be an instance of a TCP, UDP or like protocol (hereinafter referred to as just TCP). The TCP protocol is also provided by the processor(s) 820 operating on instructions and information contained in the memory unit 825. For each instance of the TCP protocol, there is an instance of an IP protocol, or like protocol. The IP protocol is also provided by the processor(s) 820 operating on instructions and information contained in the memory unit 825. For all the instances of the IP protocols, there is a DLPI or like instance of the protocol stack. The DLPI is provided by firmware in the NIC 830, and/or the processor(s) 820 operating on instructions and information contained in the memory unit 825.

The DLPI provides for receipt of data packets from the communication channel 835. The IP protocol provides for addressing and routing functions utilizing aggregated headers. The TCP protocol provides for flow control functions also utilizing the aggregated headers. The aggregated headers are contained in contiguous blocks of memory.

In one implementation, the DLPI provides for aggregation and header/payload splitting of the received data packets. In another implementation, aggregation and header/payload splitting is provided by the IP protocol.

The aggregate stream handling of data packet headers provides for amortization of the input/output memory management unit related costs across a number of data packets. As a result, per-packet costs are reduced, which reduces utilization of the host processor, and increases network throughput.

By processing data packets whose header and payloads reside in separate blocks of memory (where each block is contiguous), the number of input/output memory management unit operations can be significantly decreased. Furthermore, by allowing batches of data packets to be processed at one time (multi-data reception), up to a 20% reduction in the cycles per instructions ration may be realized for the same benchmark. This directly translates to a high percentage of processor 820 idle time that can be used by the network device 810 to handle other tasks.

Figure 9:
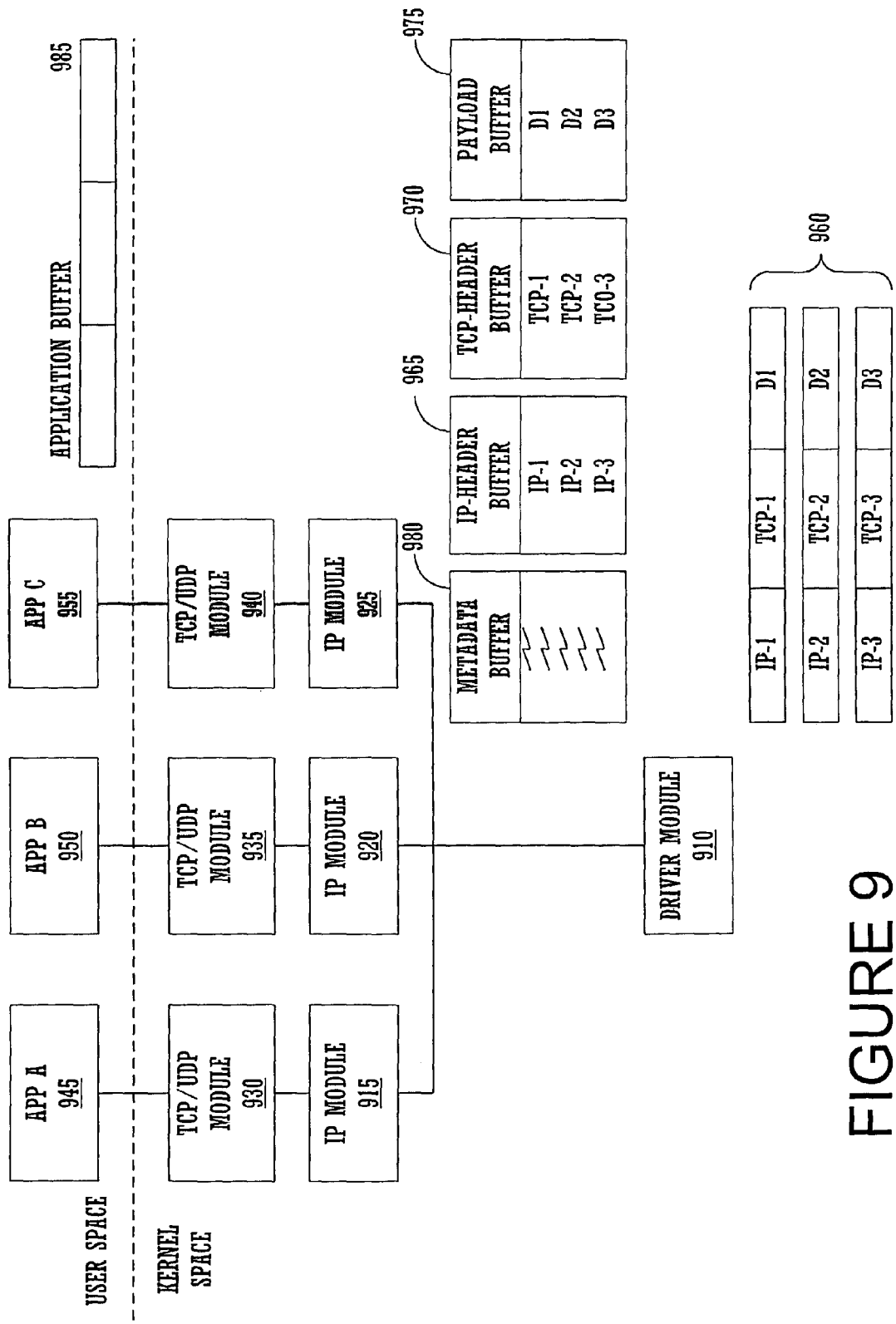
FIG. 9 shows a diagram of an exemplary network communication protocol suite in accordance with one embodiment of the present invention.

Referring now to FIG. 9, a diagram of a network communication protocol suite in accordance with one embodiment of the present invention is shown. As depicted in FIG. 9, the network communication protocol comprises a driver module 910 communicatively coupled to one or more instances of an IP module 915, 920, 925. Each instance of the IP module 915, 920, 925 is communicatively coupled to an instance of a TCP/UDP module 930, 935, 940. Each instance of the TCP/UDP module 930, 935, 940 is communicatively coupled to an application 945, 950, 955.

The driver module provides for multi-data receipt of data packets transmitted across a network. In multi-data reception, the driver module 910 collects multiple data packets 960 for the same application. When multiple data packets 960 for the same application are received, the driver module 910 aggregates the packets.

The driver module 910 also implements header/payload splitting, which allows the header and payload portions of the data packet to be placed in separate buffers 965, 970, 975 upon reception. The driver module 910 splits the data packets by loading the payload of each packet into a payload buffer 975, loading the IP header of each packet into an IP header buffer 965, loading the TCP/UDP header of each packet into a TCP header buffer 970, and loading information about the aggregation and splitting into a metadata buffer 980. The metadata buffer 980 may contain a pointer to the start of the header buffers 965, 970 and payload buffer 975, the number of packet elements, the location and length of each packet element, and the like, for the aggregated packets.

In one implementation, the driver module 910 loads the data packets into the header buffers 965, 970 and payload buffer 975 in the order that the packets are received by the driver module. In another implementation, the driver module 910 reorders the data packets according to the sequence number in the header of each packet, before loading the data packets into the header buffers 965, 970 and payload buffer 975.

The driver module 910 checks the TCP/UDP header to determine the destination application. The driver module then passes a metadata pointer to the appropriate instance of the IP module (e.g. 925).

Upon receipt of the metadata buffer pointer, the IP module 925 fetches the information in the metadata buffer 980. The information contained in the metadata buffer 980 provides the IP module 925 with a pointer to the IP header buffer 965. Therefore, the IP module can retrieve the IP headers for the multiple data packets in a single input/output memory management unit. A fetch in a single input/output memory management unit is possible because the IP headers are stored in a contiguous memory block. The IP module 925 then processes the IP headers to provide routing of the data packets.

The IP module 925 then passes the metadata pointer to the appropriate instance of the TCP/UDP module 940. The information contained in the metadata buffer 980 provides the TCP/UDP module 940 with a pointer to the TCP header buffer 970. Therefore, the TCP/UDP module 940 can retrieve the TCP headers for the multiple data packets in a single input/output memory management unit. A fetch in a single input/output memory management unit is possible because the TCP headers are stored in a contiguous memory block. The TCP/UDP module 940 then processes the TCP headers to provide flow control of the data packets.

In one implementation, the TCP/UDP module 940 then passes a payload pointer to the destination application 955. Thus, only one input/output memory management unit is necessary to fetch the payload data, because the payload buffer is a contiguous block of memory.

In another implementation, the TCP/UDP module 940 loads the payload from the payload buffer 975 into an application buffer 985 according to the sequence number in the corresponding header. The application buffer 985 thus contains a contiguous payload. The TCP/UDP module 940 then passes an application pointer to the destination application. Again, only one input/output memory management unit is necessary to fetch the payload data, when the application buffer is a contiguous block of memory.

Hence, buffering the IP headers, TCP headers, and payload in separate but contiguous memory blocks, reduces the per-packet processing that the IP and TCP/UDP modules have to perform and reduces the overall overhead cost of processing the data.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A network device comprising:
    a driver module for communicating with a network, wherein the driver module receives and collects a plurality of data packets destined for a same application, the driver module configured to wait for a predefined condition when collecting multiple data packets for the same application;
    a protocol module communicatively coupled to the driver module, wherein the protocol module processes aggregated headers of the plurality of data packets to provide routing and flow control; and
    an application communicatively coupled to the protocol module, wherein the application module processes aggregated payloads of the plurality of data packets.

2. The network device according to claim 1, wherein the driver module aggregates the plurality of data packets.

3. The network device according to claim 1, wherein the driver module splits the plurality of data packets into headers and payloads.

4. The network device according to claim 1, wherein the protocol module aggregates the plurality of data packets.

5. The network device according to claim 1, wherein the protocol module splits the plurality of data packets into headers and payloads.

6. The network device according to claim 1, wherein the protocol module provides a TCP/IP protocol suite.

7. The network device according to claim 1, wherein the aggregated headers are buffered in a first contiguous memory block.

8. The network device according to claim 7, wherein the aggregated payloads are buffered in a second contiguous memory block.

9. The network device according to claim 8, wherein metadata concerning the aggregated headers are buffered in a third contiguous memory block.

10. The network device according to claim 9, wherein metadata concerning the aggregated payloads are buffered in a forth contiguous memory block.

11. The network device according to claim 9, wherein the protocol module fetches the aggregated headers from the first contiguous memory block in one input/output memory management unit utilizing the metadata.

12. The network device according to claim 10, wherein the application fetches the aggregated payloads from the second contiguous memory block in one input/output memory management unit utilizing the metadata.

13. The network device according to claim 1, wherein the driver module comprises a network interface card.

14. A method of performing network communication comprising:
    collecting and accessing a plurality of received data packets destined for a same application;
    aggregating the plurality of received data packets until a predefined condition is satisfied;
    splitting the plurality of received data packets into aggregated headers and aggregated payloads;
    buffering the aggregate headers in a first contiguous memory block;
    buffering the aggregate payloads in a second contiguous memory block; buffering metadata in a third contiguous memory block, wherein the metadata comprises characteristics of the buffered aggregate headers and buffered aggregated payloads;
    processing the buffered aggregated headers according to a network communication protocol; and
    providing the buffered aggregated payloads to a destination application.

15. The method in accordance with claim 14, wherein the network communication protocol is a TCP/IP protocol suite.

16. The method in accordance with claim 14, wherein the network communication protocol comprises a network layer.

17. The method in accordance with claim 16, wherein the network layer comprises an internet protocol (IP).

18. The method in accordance with claim 14, wherein the network communication protocol comprises a transport layer.

19. The method in accordance with claim 18, wherein the transport layer comprises a transmission control protocol (TCP).

20. The method in accordance with claim 14, wherein accessing the plurality of data packets is provided by a network interface card.

21. The method in accordance with claim 14, wherein aggregating the data packets; splitting the data packets, buffering the aggregate headers, buffering the aggregate payloads and buffering the metadata is provided by a network interface card.

22. The method in accordance with claim 14, wherein aggregating the data packets, splitting the data packets, buffering the aggregate headers, buffering the aggregate payloads and buffering the metadata is provided by a protocol module.

23. A mechanism for performing network communication comprising:
   a means for processing aggregated headers of a plurality of received data packets according to a protocol, the aggregated headers collected from received data packets destined for a same application until a predefined condition is satisfied; and
   a means for providing aggregated payloads of the plurality of received data packets to a destination application, the aggregated payloads collected from received data packets destined for the same application until a predefined condition is satisfied.

24. The mechanism according to claim 23, wherein the aggregated headers are buffered in a first contiguous memory block.

25. The mechanism according to claim 24, wherein the means for processing aggregated headers according to a protocol comprises a means for fetching the aggregated headers in a single input/output memory management unit.

26. The mechanism according to claim 25, wherein the means for processing aggregated headers according to a protocol further comprises a means for processing the aggregated headers according to an internet protocol (IP).

27. The mechanism according to claim 26, wherein the means for processing aggregated headers according to a protocol further comprises a means for processing the aggregated headers according to an transmission control protocol (TCP).

28. The mechanism according to claim 24, wherein the aggregated payloads are buffered in a second contiguous memory block.

29. The method of providing network communication according to claim 28, wherein the means for providing aggregated payload to a destination application comprises:
   a means for copying the aggregated payloads to an application buffer in a single input/output memory management unit.

30. A computer-readable medium having computer executable instructions which when executed by a network device causes the network device to implement a multi-data receiving method, the method comprising:
   receiving and collecting data packets destined for the same application;
   aggregating the data packets in memory until a predefined condition is satisfied;
   splitting the data packets into headers and payloads;
   buffering aggregated headers in a first contiguous memory block;
   buffering aggregated payloads in a second contiguous memory block;
   buffering metadata in a third contiguous memory block, wherein the metadata comprises characteristics of the buffered aggregated headers and buffered aggregated payloads;
   processing the buffered aggregated headers according to a network communication protocol; and
   providing the buffered aggregated payloads to a destination application.

31. The computer-readable medium having computer executable instructions according to claim 30, wherein the network communication protocol comprises:
   a network layer; and
   a transport layer.

32. The computer-readable medium having computer executable instructions according to claim 31, wherein the network layer comprises an internet protocol (IP).

33. The computer-readable medium having computer executable instructions according to claim 31, wherein the transport layer comprises a transmission control protocol (TCP).

* * * * *